United States Patent [19]
Ochiai

[11] Patent Number: 6,038,141
[45] Date of Patent: Mar. 14, 2000

[54] RESONANCE POWER SUPPLY CIRCUIT OF VARIABLE CAPACITY TYPE

[75] Inventor: Masashi Ochiai, Saitama-ken, Japan

[73] Assignee: Kabushiki Kaisha Toshiba, Kawasaki, Japan

[21] Appl. No.: 09/200,596

[22] Filed: Nov. 27, 1998

[30] Foreign Application Priority Data

Nov. 28, 1997 [JP] Japan ................................ 9-329080

[51] Int. Cl.⁷ .................................................. H02M 3/335
[52] U.S. Cl. ............................................ 363/16; 363/97
[58] Field of Search .............................. 363/15, 16, 21, 363/20, 95, 97, 131

[56] References Cited

U.S. PATENT DOCUMENTS

5,490,052  2/1996  Yoshida et al. ........................ 363/15
5,598,324  1/1997  Imamura et al. ....................... 363/21
5,748,458  5/1998  Ochiai ................................... 363/17
5,805,432  9/1998  Zaitsu et al. ........................... 363/16

*Primary Examiner*—Shawn Riley
*Attorney, Agent, or Firm*—Pillsbury Madison & Sutro LLP

[57] ABSTRACT

A current resonance power supply circuit resonates the primary winding L61 of the switching transformer 64 and the current resonance capacitor C2I by turning on and off the switching elements 61 and 62 and obtains high frequency output from the secondary winding L62 of the switching transformer 64 according to such resonance. With a capacitor whose capacity increases as the operation frequency of the switching elements 61 and 62 decreases used as the capacitor C2I above, the out-of-resonance phenomenon hardly occurs upon a sharp drop of the AC power voltage or a quick increase of the load.

7 Claims, 11 Drawing Sheets

(RELATED ART)

(RELATED ART)

(RELATED ART)

FIG.10(a) GATE VOLTAGE VG11

FIG.10(b) GATE VOLTAGE VG12

FIG.10(c) CURRENT IC61

(RELATED ART)

(RELATED ART)

RESONANCE POWER SUPPLY CIRCUIT OF VARIABLE CAPACITY TYPE

BACKGROUND OF THE INVENTION

1. Field of the Invention

The present invention relates to a resonance type power supply circuit.

2. Description of the Related Art

The power supply circuit of current resonance type has been conventionally implemented as one of the power supply circuits used in electronic devices such as a TV set.

Figure 5:
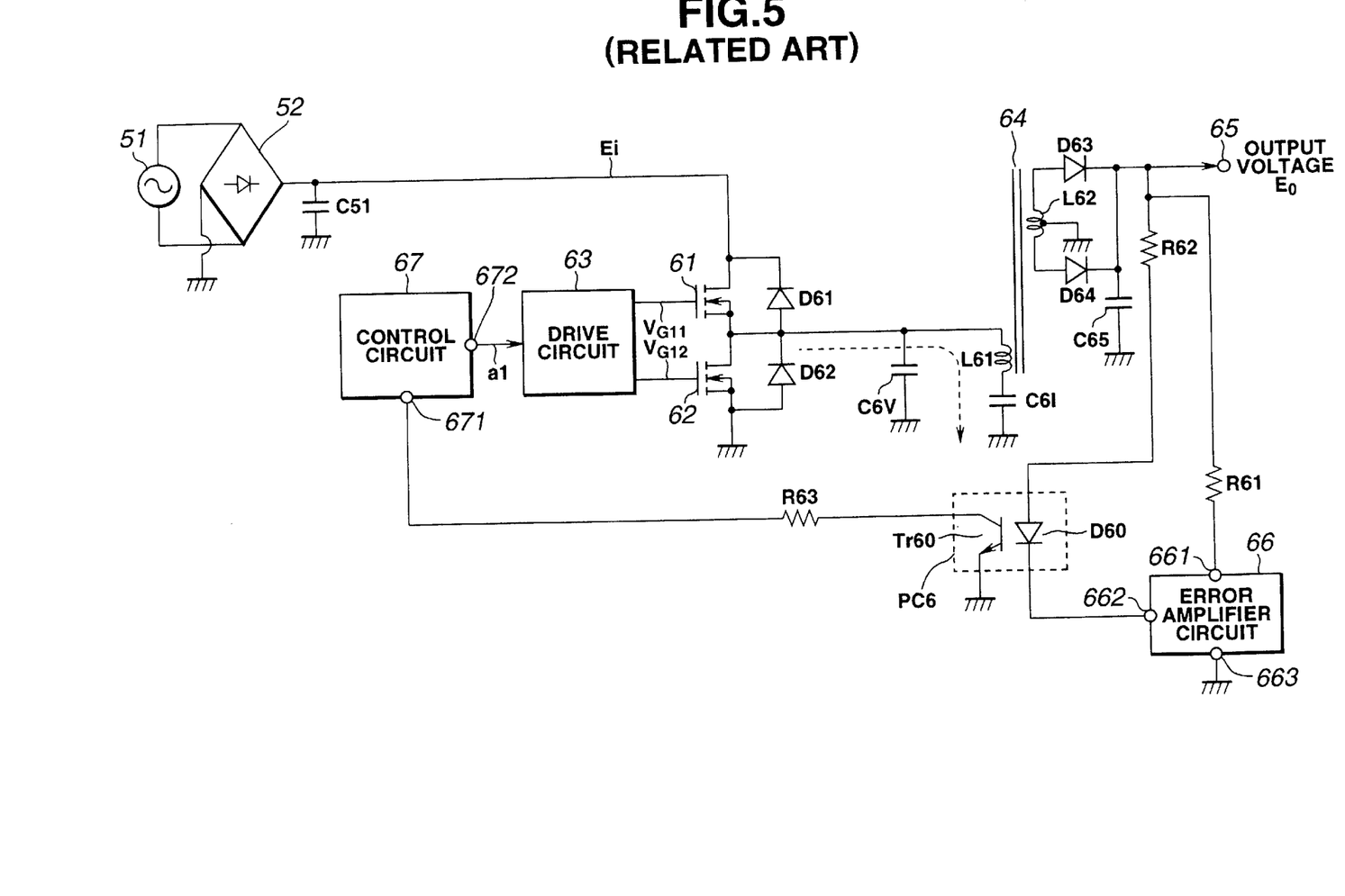
FIG. 5 is a schematic circuit diagram showing a conventional power supply circuit of current resonance type.

FIG. 5 is a circuit diagram showing such a conventional current resonance type power supply circuit.

In the figure, an output terminal of an alternating current (AC) power supply 51 or a commercial AC power, for example, is connected to an input terminal of a rectifier circuit 52, or a full-wave rectifier using a diode bridge, for example. The other output terminal of the AC power supply 51 is connected to the other input terminal of the rectifier circuit 52.

The output terminal on the negative polarity side of the rectifier circuit 52 is connected to the reference potential point.

The output terminal on the positive polarity side of the rectifier circuit 52 is connected to the reference potential point via a smoothing capacitor C51 and also connected to the reference potential point via switching elements 61 and 62 connected in series. For the switching elements 61 and 62, a field effect transistor such as a MOSFET may be used. With such elements, the parasitic diode incorporated in the configuration of the field effect transistor can be used for inverse current flowing.

The source of the switching element 61 is connected to the drain of the switching element 61 via the anode-cathode channel of a parasitic diode D61. The source of the switching element 62 is connected to the drain of the switching element 62 via the anode-cathode channel of a parasitic diode D62.

The switching elements 61 and 62 are turned on and off by a drive circuit 63.

The connection point of the switching elements 61 and 62 is connected to the reference potential point via a voltage resonance capacitor C6V and at the same time connected to the reference potential point via a primary winding L61 of a switching transformer 64 and a current resonance capacitor C6I connected in series. Usually, the current resonance capacitor C6I has a larger capacity than the voltage resonance capacitor C6V. The secondary winding of the switching transformer 64 is connected to an output terminal 65 via the anode-cathode channel of a diode D63 at an end and connected to the output terminal 65 via the anode-cathode channel of a diode D64 at the other end. The cathodes of the diodes D63 and D64 are connected to the reference potential point via a smoothing capacitor C65. With such connections, the output voltage Eo is led to the output terminal 65.

The cathodes of the diodes D63 and D64 are connected to an input terminal 661 of an error amplifier circuit 66 via a resistor R61 and also connected to an output terminal 662 of the error amplifier circuit 66 via a resistor R62 and the anode-cathode channel of a light emitting diode D60 in a photo coupler PC6. The error amplification circuit has a negative polarity terminal 663 connected to the reference potential point.

On the other hand, a control circuit 67 has a detection terminal 671 connected to the reference potential point via a resistor R63 and a phototransistor Tr60 in the photo coupler PC6 connected in series and has an output terminal 672 connected to the drive circuit 63. The control circuit 67 prepares a control signal a1 at the output terminal 672 according to the current flowing from the detection terminal 671 to the resistor R63 and supplies such signal to the drive circuit 63. The drive circuit 63 supplies, corresponding to the control signal a1 from the control circuit 67, gate voltages VG11 and VG12 to turn on and off the switching elements 61 and 62 to the gates of the switching elements 61 and 62 respectively.

The error amplifier circuit 66 amplifies the error between the voltage applied to the input terminal 661 via the resistor R61 and the target voltage and, according to the amplified voltage, controls the current flowing through the light emitting diode D60. Thus, the resistors R61 and R62, the error amplifier circuit 66, the photo coupler PC6, the drive circuit 63 and the control circuit 67 control the operation frequency f of the switching elements 61 and 62 corresponding to the change in the output voltage on the secondary side of the transformer 64.

The operation in a conventional example is described below.

Figures 6A, 6E:
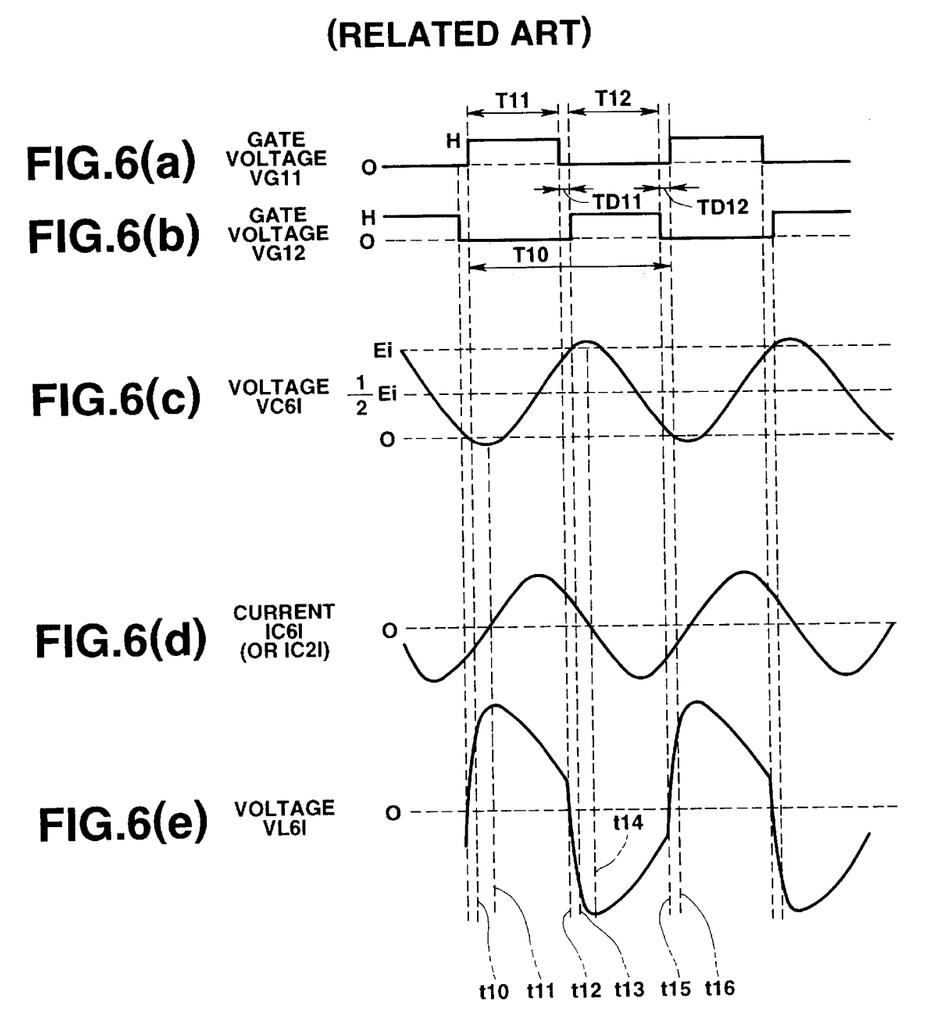

FIGS. 6(a) to (e) are timing charts showing the operation of a conventional current resonance type power supply circuit. FIG. 6(a) shows the gate voltage VG11 of the switching element 61 and FIG. 6(b) shows the gate voltage VG12 of the switching element 62. FIG. 6(c) shows the voltage VC6I applied to the capacitor C6I, FIG. 6(d) shows the current IC6I flowing through the capacitor C6I and FIG. 6(e) shows the voltage VL6I applied to the primary winding L61. In these figures, the interval from timing t10 to timing t16 constitutes one period.

Figure 7A:
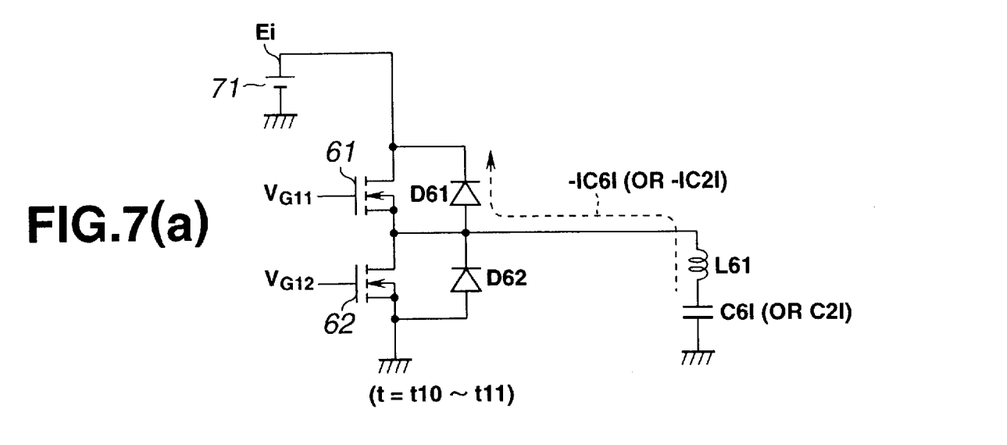
Figure 7B:
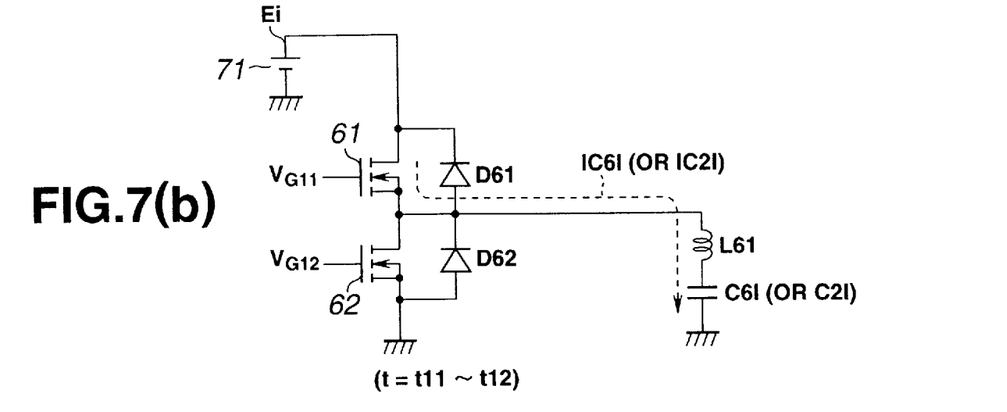
Figure 7C:
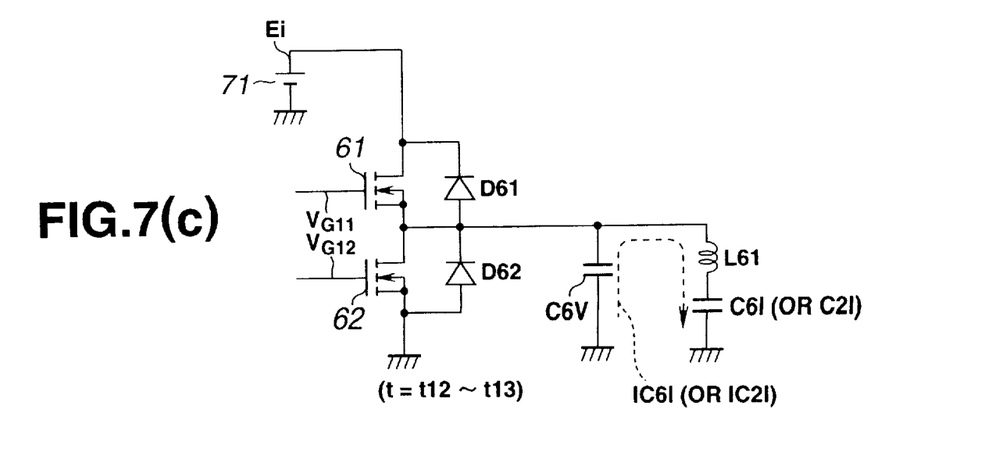
Figure 8A:
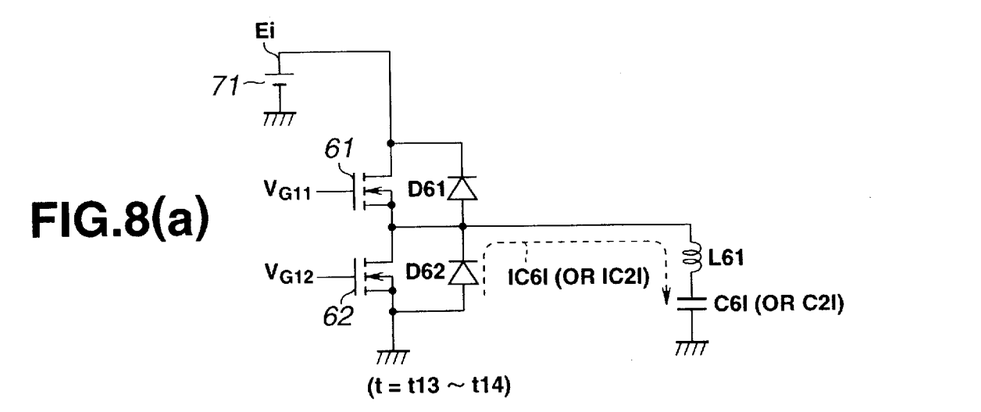
Figure 8B:
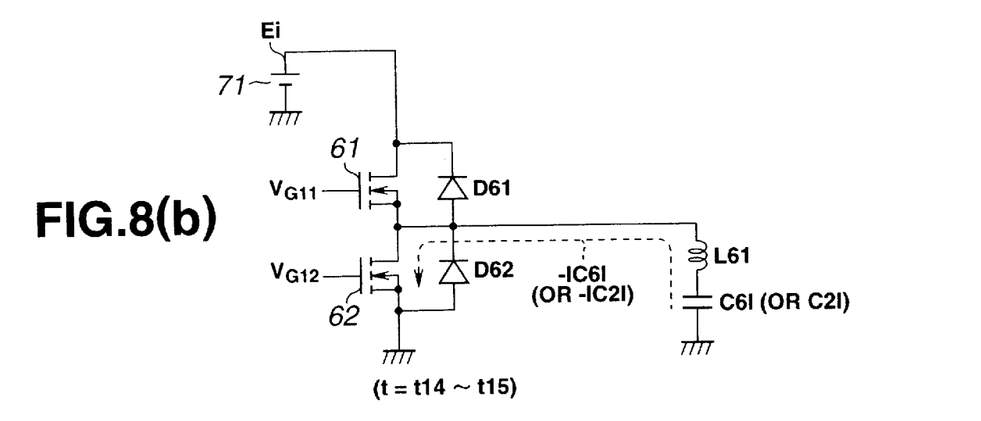
Figure 8C:
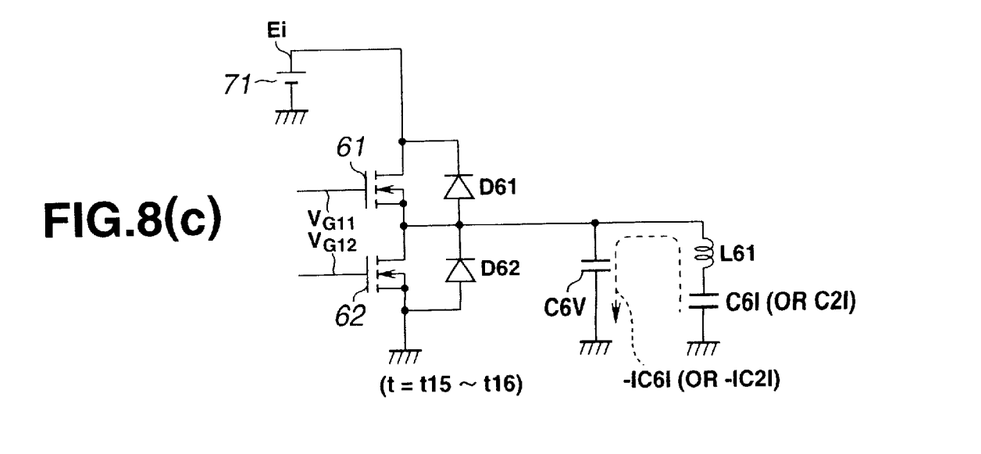

FIGS. 7(a) to (c) and FIGS. 8(a) to (c) are explanatory views illustrating the operation of a conventional current resonance type power supply circuit. FIGS. 7(a) to (c) illustrate the first half (t10 to t13) of the period in FIGS. 6(a) to (e) and FIGS. 8(a) to (c) illustrate the latter half (t13 to t16) of the period in FIGS. 6(a) to (e). FIG. 7(a) shows the operation of timings from t10 to t11, FIG. 7(b) shows the operation of timings from t11 to t12 and FIG. 7(c) shows the operation of timings t12 to t13. FIG. 8(a) shows the operation of timings t13 to t14, FIG. 8(b) shows the operation of timings t14 to t15 and FIG. 8(c) shows the operation of timings t15 to t16.

First, the AC power voltage from the AC power supply 51 is rectified by the rectifier circuit 52, smoothed by the smoothing capacitor C51 and supplied as the direct current (DC) voltage Ei to the switching elements 61 and 62. In FIGS. 7 and 8, the AC power supply 51, the rectifier circuit 52 and the smoothing capacitor C51 are shown as a DC power supply 71 for output of the DC voltage Ei to simplify the description.

The drive circuit 63 supplied, corresponding to the control signal a1 from the control circuit 67, the gate voltages VG11 and VG12 as shown in FIGS. 6(a) and (b) to the gates of the switching elements 61 and 62.

In this case, the gate voltage VG11 shown in FIG. 6(a) is at the high level (H) to turn on the switching element 61 for the time T11 from t10 to t12 and is at the 0 level to turn off the switching element 61 from t12 to t16. On the other hand, the gate voltage VG12 in FIG. 6(b) is at the high (H) level to turn on the switching element 62 for the time T12 from t13 to t15 and is at the 0 level to turn off the switching element 62 from t10 to t13 and from t15 to t16. For the gate voltages VG11 and VG12, the time T10 from t10 to t16 is one period.

In the time from timing t10 to timing t11 as shown in FIG. 7(a), the diode D61 is turned on and the current flows through the route from the capacitor C6I to the winding L6I and then to the diode D61. The voltage VC61 applied to the capacitor C6I as shown in FIG. 6(c) goes down from 0V to the minimum level and the current IC61 flowing in the capacitor C6I as shown in FIG. 6(d) rises from the negative side to 0A level. The voltage VL61 applied to the primary winding L6I shown in FIG. 6(e) rises to the maximum level.

In the time from timing t11 to timing t12 as shown in FIG. 7(b), the switching element 61 is turned on and the current flows through the route from the switching element 61 to the winding L61 and then to the capacitor C6I. The voltage VC61 shown in FIG. 6(c) rises from the minimum level, passes 0V and enters the positive side. The current IC61 shown in FIG. 6(d) rises from 0A to the maximum level and then lowers. The voltage VL61 shown in FIG. 6(e) lowers from the maximum level. Note that, however, the current flowing from the switching element 61 to the capacitor C6V during this time is omitted in FIG. 7(b) since it is of a small amount.

The time TD11 (see FIG. 6(b)) from timing t12 to timing t13 as shown in FIG. 7(c) is a damper time. The current flows through the route from the capacitor C6V to the winding L61 and then to the capacitor C6I. The voltage VC6I shown in FIG. 6(c) rises in the positive side to reach Ei. The current IC61 shown in FIG. 6(d) lowers in the positive side and the voltage VL61 shown in FIG. 6(e) sharply lowers under the effect of resonance.

In the time from timing t13 to timing t14 as shown in FIG. 8(a), the diode D62 is turned on and the current flows through the route from the diode D62 to the winding L61 and then to the capacitor C6I. The voltage VC61 shown in FIG. 6(c) rises from Ei to the maximum level, the current IC6I shown in FIG. 6(d) lowers in the positive side to reach 0A, and the voltage VL61 shown in FIG. 6(e) lowers in the negative side to reach the minimum level.

In the time from timing t14 to timing t15 as shown in FIG. 8(b), the switching element 62 is turned on and the current flows through the route from the capacitor C6I to the winding L61 and then to the switching element 62. The voltage VC6I shown in FIG. 6(c) lowers from the maximum level in the positive side to a level in the negative side. The current IC6I shown in FIG. 6(d) lowers from 0A to the minimum level and then rises in the negative side. The voltage V161 shown in FIG. 6(e) rises from the minimum level in the negative side.

The time TD12 (see FIG. 6(b)) from timing t15 to timing t16 as shown in FIG. 8(c) is a damper time. The current flows through the route from the capacitor C6I to the winding L61 and then to the capacitor C6V. The voltage VC6I as shown in FIG. 6(c) lowers in the negative side to reach 0V and the current IC6I shown in FIG. 6(d) rises in the negative side. The voltage VL61 as shown in FIG. 6(e) sharply rises under the effect of resonance.

Figure 9:
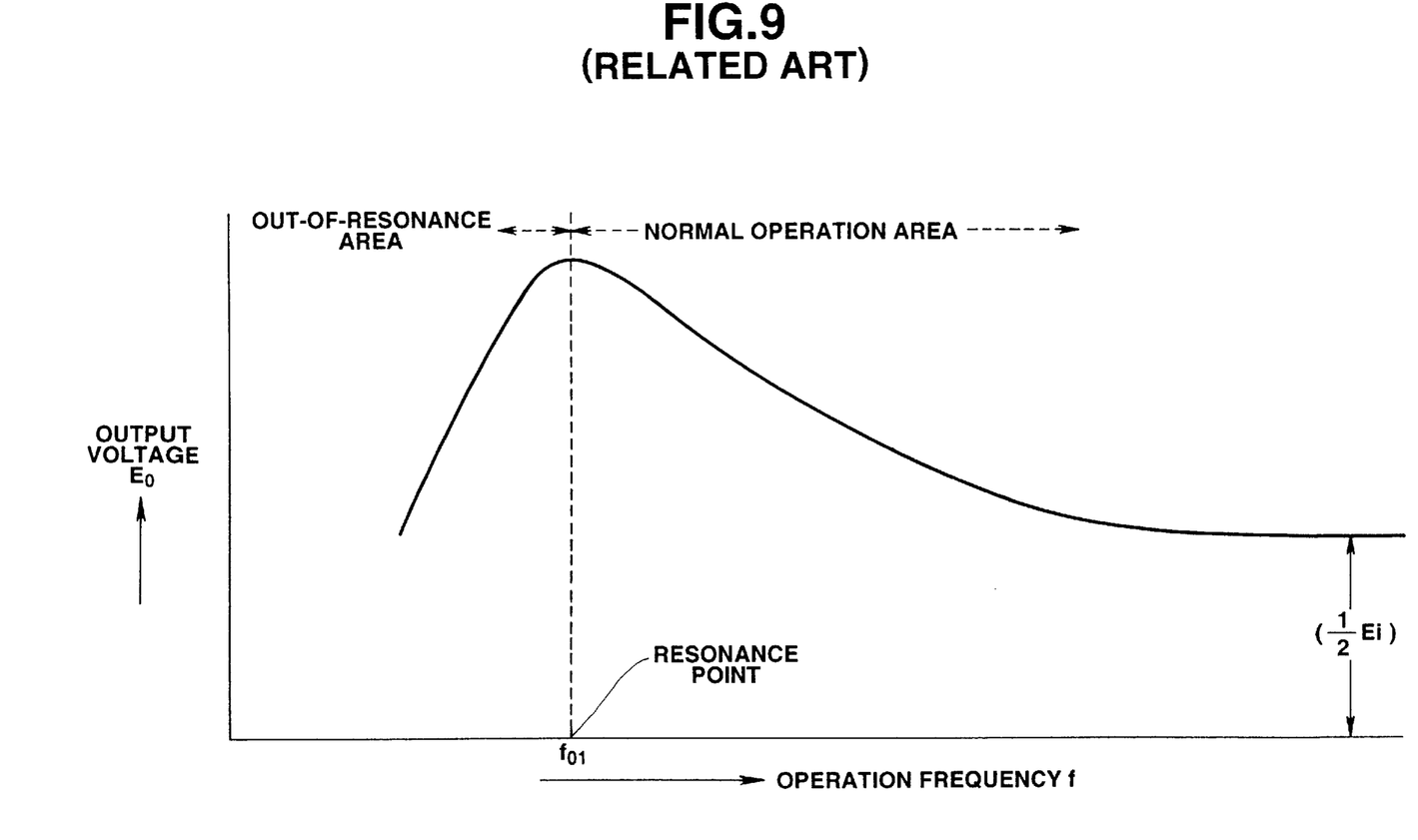
FIG. 9 is a graph showing the control characteristics of the output voltage caused by the change in the operation frequency of the power supply circuit in FIG. 5.

FIG. 9 is a graph showing the control characteristic of the operation frequency f at the current resonance type power supply circuit in FIG. 5. The output voltage Eo is indicated on the vertical axis and the operation frequency f is on the horizontal axis. As understood from the characteristics, the output voltage Eo becomes the maximum when the operation frequency f is close to the resonance point f01. The specified range higher than the resonance point f01 is the normal operation area. Therefore, the output voltage Eo can be kept stable by controlling the operation frequency f corresponding to the change in the output voltage Eo.

In FIG. 9, when the output voltage Eo declines, for example, the error amplifier circuit 66 detects the decline of the output voltage Eo in the range of the normal operation area. In such case, the photo coupler PC6 and the control circuit 67 control the drive circuit 63 to change the on/off status of the switching elements 61 and 62 so that the operation frequency f is reduced and the output voltage Eo is increased. Thus, the output voltage Eo is restored to the original level.

Suppose, in such a conventional resonance power supply circuit, the load connected to the output terminal 65 rapidly increases or the output of the AC power supply 51 sharply declines, and the output voltage Eo becomes lower than a predetermined level. In such case, the operation frequency f quickly lowers to compensate for such change and may become lower than the resonance frequency f01 for the primary winding L61 of the switching transformer 64 and the capacitor C6I (See FIG. 9). This is the "out-of-resonance" phenomenon. When the operation frequency thus becomes lower than the resonance frequency, the impedance of the resonance circuit consisting of the primary winding L61 and the capacitor C6I becomes negative (capacitive) $[\omega L-(1/\omega C)<0$ where $\omega$ is the angular frequency, L is the inductance of the primary winding L61 and C is the capacity of the capacitor C6I]. This makes the phase of the resonance current for the gate voltage proceed by $\pi$ (radian) and the resonance current directions for the rising and breaking points of the gate voltages as shown in FIGS. 7(a) to (c) and FIGS. 8(a) to (c) are reversed (Reverse phase) as shown in FIGS. 11(a) to (c) and FIGS. 12(a) to (c).

Referring to FIGS. 10(a) to (c), FIGS. 11(a) to (c) and FIGS. 12(a) to (c), the out-of-resonance status is described below.

Figure 10A:
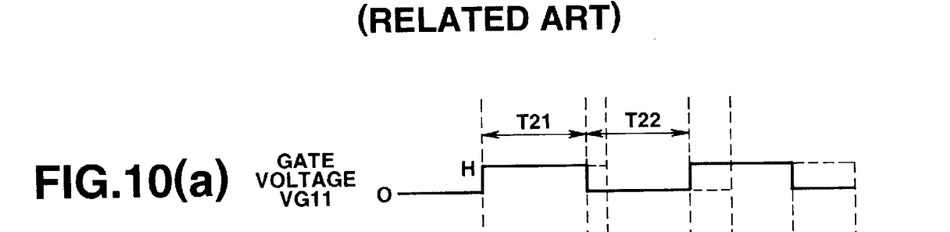
Figure 10B:
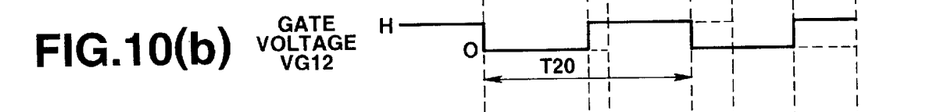
Figure 10C:
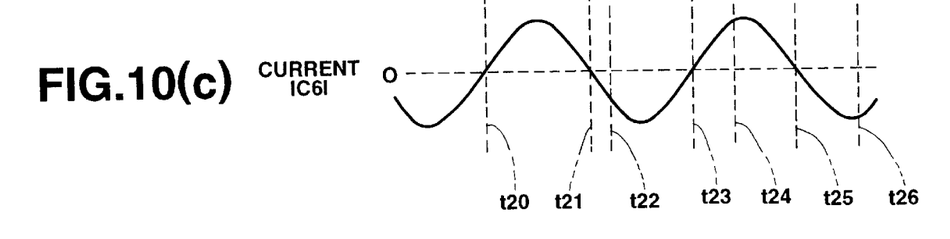

FIG. 10(a) to (c) show timing charts illustrating the operation waveform in the out-of-resonance status. FIG. 10(a) shows the gate voltage VG11 of the switching element 61, FIG. 10(b) shows the gate voltage VG12 of the switching element 62 and FIG. 10(c) shows the current IC61 flowing through the capacitor C6I.

When FIGS. 10(a) to (c) are compared with FIGS. 6(a) to (e), the times T21 and T22 in FIGS. 10(a) to (c) are longer than the times T11 and T12 in FIGS. 6(a) to (e). The former figures have a longer period T20 and a low operation frequency.

Figure 11A:
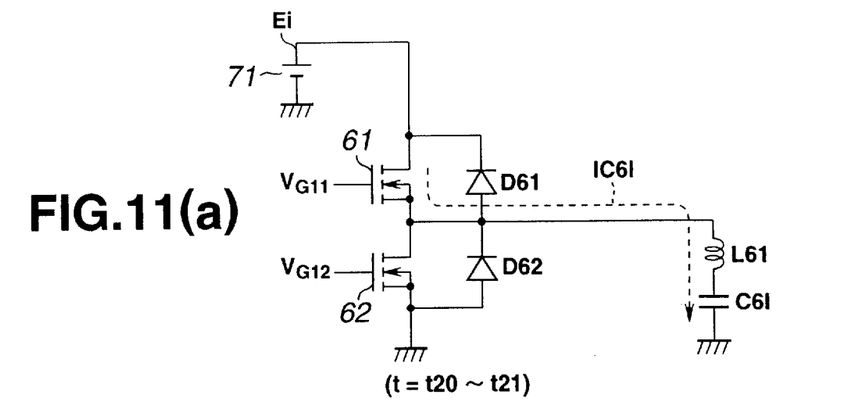
Figure 11B:
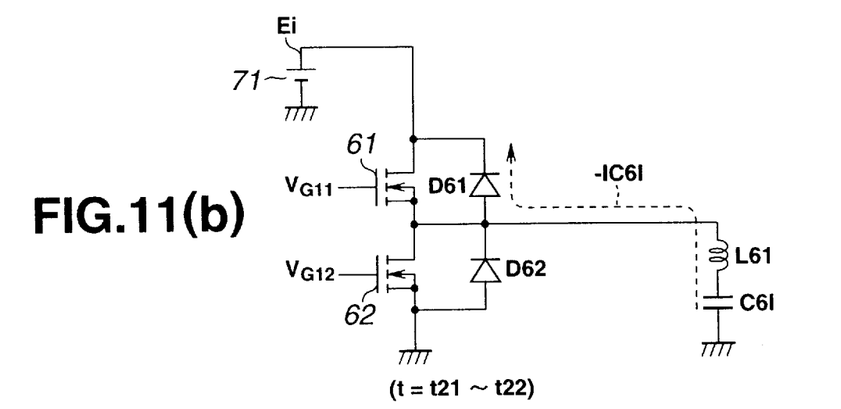
Figure 11C:
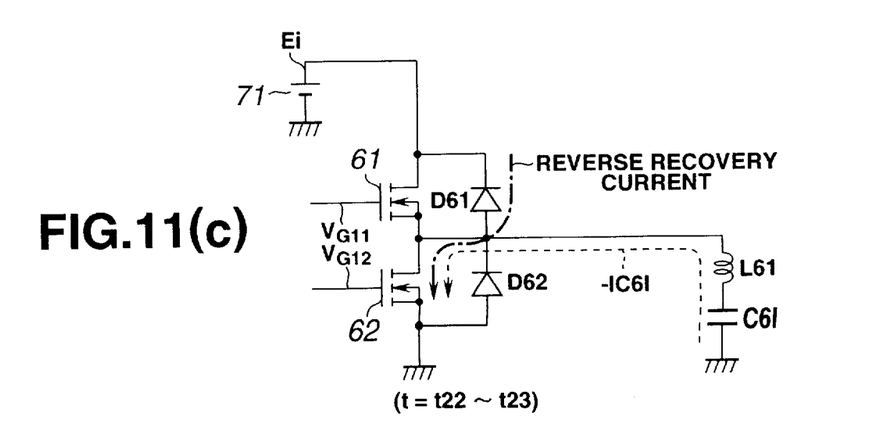
Figure 12A:
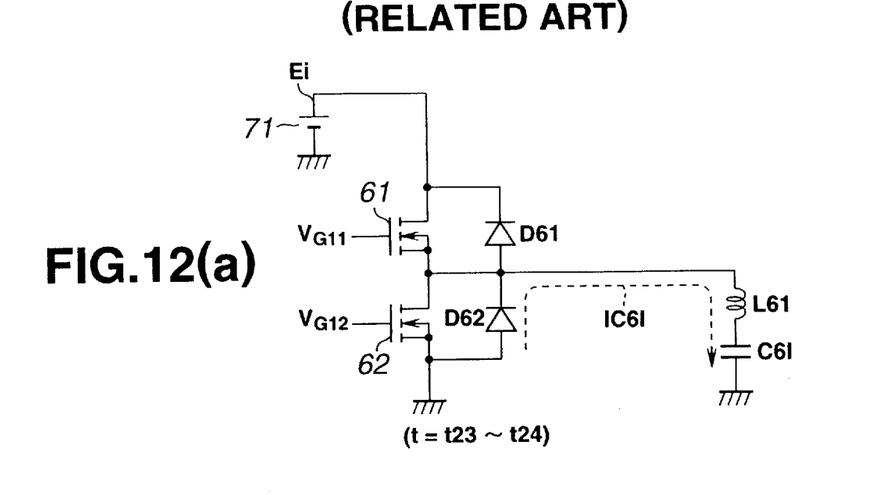
Figure 12B:
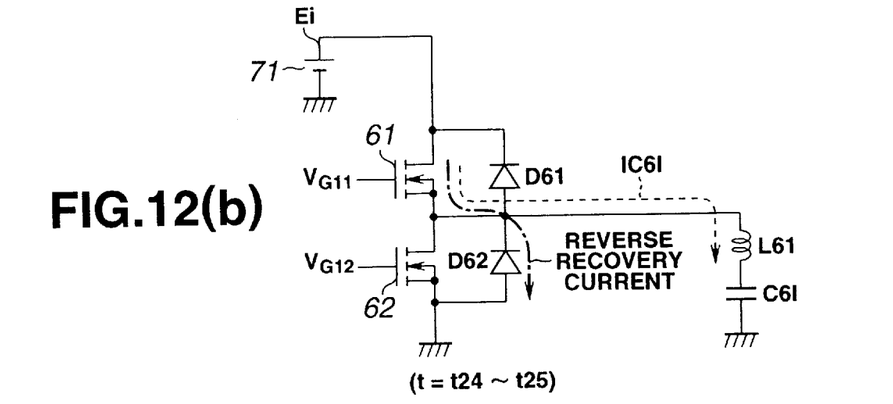
Figure 12C:
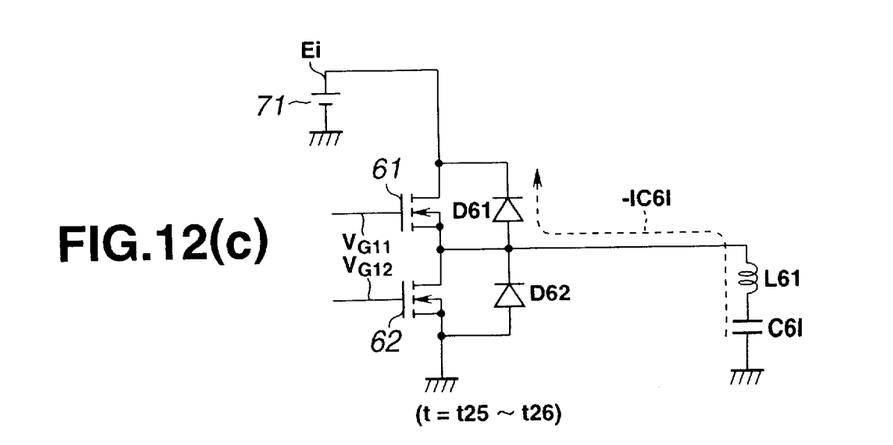

FIGS. 11(a) to (c) and FIG. 12(a) to (c) are explanatory views illustrating the current route in the out-of-resonance status. FIGS. 11(a) to (c) and FIGS. 12(a) to (c) show the operation in a period (T20) as shown in FIGS. 10(a) to (c). FIG. 11(a) shows the operation of timings from t20 to t21, FIG. 11(b) shows the operation of timings from t21 to t22 and FIG. 11(c) shows the operation of timings from t22 to t23. FIG. 12(a) shows the operation of timings from t23 to t24, FIG. 12(b) shows the operation of timings from t24 to t25 and FIG. 12(c) shows the operation of timings from t25 to t26.

The drive circuit 63 supplies, according to the control signal a1 from the control circuit 67, the gate voltages VG11 and VG12 as shown in FIGS. 10(a) and 10(b) to the gates of the switching elements 61 and 62.

In this case, the gate voltage VG11 as shown in FIG. 10(a) is at the high (H) level to turn on the switching element 61 for the time T21 from t20 to t21 and the time from t23 to t25. It is at the 0 level to turn off the switching element 61 for the times from t21 to t23 and from t25 to t26. On the other hand, the gate voltage VG12 as shown in FIG. 10(b) is at the high (H) level to turn on the switching element 62 for the time T22 from t21 to t23 and is at the 0 level to turn off the switching element 62 for the times from t20 to t21 and from t23 to t25. For the gate voltages VG11 and VG12, the interval T20 from t20 to t23 is one period.

In the time from timing t20 to timing t21 as shown in FIG. 11(*a*), the switching element 61 is turned on and the current flows through the route from the switching element 61 to the winding L61 and then to the capacitor C6I. The current IC6I flowing through the capacitor C6I shown in FIG. 10(*c*) rises from 0A to the maximum level and then goes down to 0A.

In the time from timing t21 to timing t22 shown in FIG. 11(*b*), the diode D61 is turned on and the current flows through the route from the capacitor C6I to the winding L61 and then to the diode D61. The current IC6I flowing at the capacitor C6I as shown in FIG. 10(*c*) declines from 0A to a level in the negative side.

In the time from timing t22 to timing t23 shown in FIG. 11(*c*), the switching element 62 is turned on and the current flows through the route from the capacitor C6I to the winding L61 and then to the switching element 62. The current IC6I flowing through the capacitor C6I as shown in FIG. 10(*c*) declines in the negative side, reaches the minimum level and then rises to 0A.

In the time from timing t23 to timing t24 shown in FIG. 12(*a*), the diode D62 is turned on and the current flows through the route from the diode D62 to the winding L61 and then to the capacitor C6I. The current IC6I flowing through the capacitor C6I shown in FIG. 10(*c*) rises from 0V to enter the positive side.

In the time from timing t24 to timing t25 as shown in FIG. 12(*b*), the switching element 61 is turned on and the current flows through the route from the switching element 61 to the winding L61 and then to the capacitor C6I. The current IC6I flowing through the capacitor C6I as shown in FIG. 10(*c*) rises in the positive side to reach the maximum level and then declines to 0A.

In the time from timing t25 to timing t26 shown in FIG. 12(*c*), the diode D61 is turned on and the current flows through the route from the capacitor C6I to the winding L61 and then to the diode D61. The current IC6I flowing through the capacitor C6I shown in FIG. 10(*c*) declines from 0A to a level in the negative side, reaches the minimum level and then rises.

In the normal status as shown in FIG. 6(*a*) to (*e*), FIG. 7 (*a*) to (*c*) and FIG. 8(*a*) to (*c*), the switching starts from the diode D61 and proceeds to the switching element 61, the diode D62, the switching element 62 and then to the diode D61. However, in the out-of-resonance status as shown in FIG. 10(*a*) to (*c*), FIG. 11(*a*) to (*c*) and FIG. 12(*a*) to (*c*), the connection is made first for the switching element 61, and then the diode D61, the switching element 62, the diode D62 and then the switching element 61. In the out-of-resonance status, if the reverse recovery current of the diode D61 (shown with a dashed line in FIG. 11(*c*)) is large at timing t22, a large amount of current flows through the diode D61 and the switching element 62. This current sometimes breaks the MOSFET of the switching element 62. Similarly, if the reverse recovery current of the diode D62 (shown with a dashed line in FIG. 12(*b*)) is large at timing t24, a large amount of current flows through the diode D62 and the switching element 61. This current sometimes breaks the MOSFET of the switching element 61.

With such a conventional power supply circuit of current resonance type, the operation frequency of the switching elements on the charge side and on the discharge side becomes lower than the resonance frequency upon a sharp decrease of the AC power voltage or a rapid increase of the load. This causes the out-of-resonance phenomenon resulting in a large amount of current flowing through the switching element, which often breaks the switching element.

SUMMARY OF THE INVENTION

An object of the present invention is to provide a current resonance type power supply circuit which is not susceptible to the out-of-resonance phenomenon when the AC power voltage sharply declines or when the load quickly increases.

The current resonance type power supply circuit of the present invention turns on and off the switching elements to resonate the primary winding of the switching transformer and the current resonance capacitor and obtains high frequency output from the secondary winding of the switching transformer according to the resonance. It is characterized by adoption of a current resonance capacitor which has a larger capacity when the operation frequency of the switching elements becomes lower.

Thus, when the operation frequency of the switching elements lowers upon a rapid decline of the AC power voltage or a quick increase of the load, the normal operation area can be enlarged toward the lower frequency side so as to suppress occurrence of the out-of-resonance phenomenon.

BRIEF DESCRIPTION OF THE DRAWINGS

FIGS. 6(*a*) to (*e*) are timing charts illustrating the normal status operation of the power supply circuit as shown in FIG. 5;

FIGS. 7(*a*) to (*c*) are first explanatory views illustrating the normal status operation of the power supply circuit in FIG. 5;

FIGS. 8(*a*) to (*c*) are second explanatory views illustrating the normal status operation of the power supply circuit in FIG. 5;

FIGS. 10(*a*) to (*c*) are timing charts illustrating the operation of the power supply circuit of FIG. 5 in the out-of-resonance status;

FIGS. 11(*a*) to (*c*) are first explanatory views illustrating the operation of the power supply circuit of FIG. 5 in the out-of-resonance status; and FIGS. 12(*a*) to (*c*) are second explanatory views illustrating the operation of the power supply circuit of FIG. 5 in the out-of-resonance status.

DETAILED DESCRIPTION OF THE PREFERRED EMBODIMENTS

Referring to the attached figures, preferred embodiments of the present invention will be described below.

Figure 1:
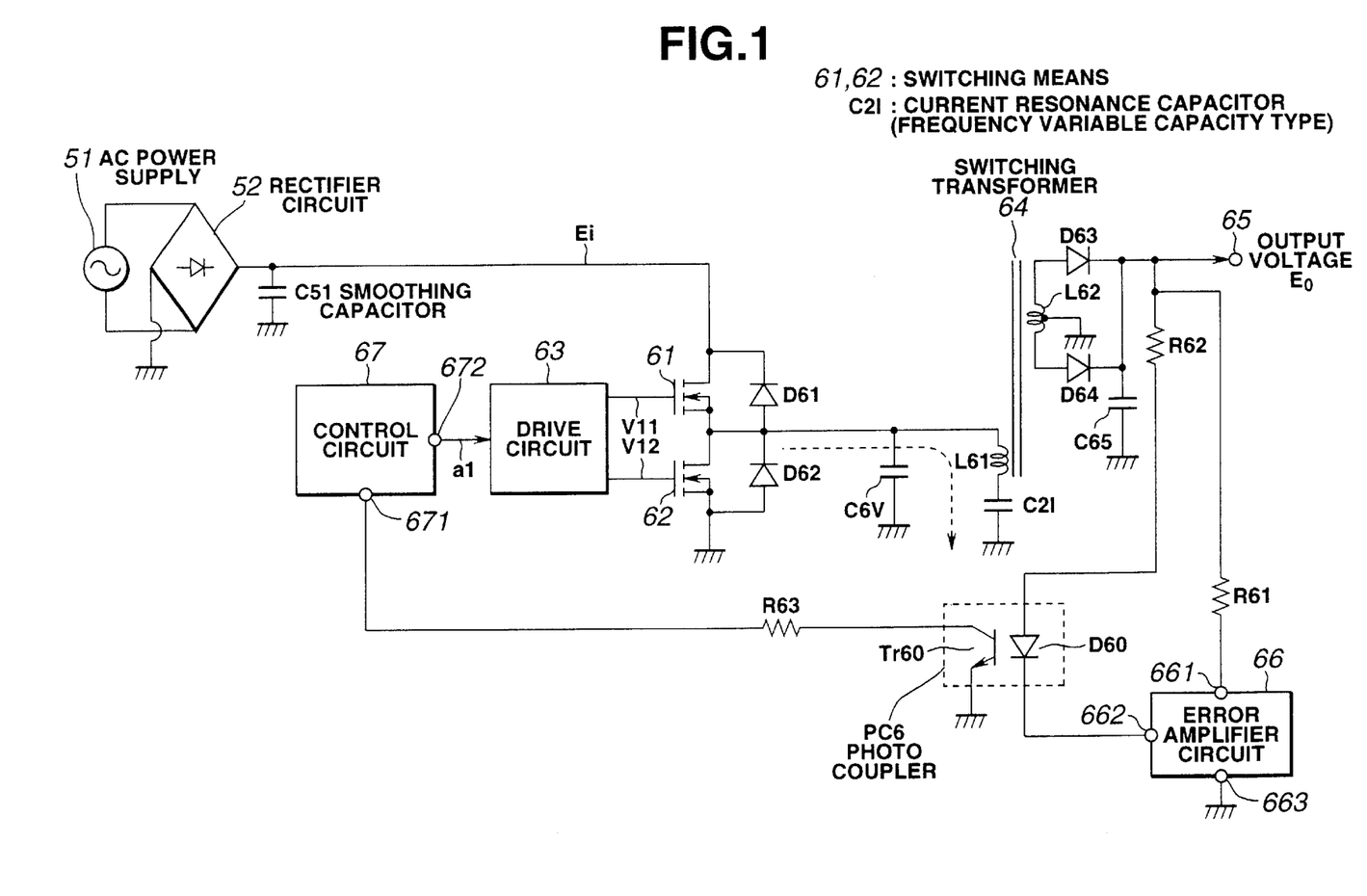
FIG. 1 is a schematic circuit diagram showing an embodiment of a current resonance type power supply circuit according to the present invention.

FIG. 1 is a schematic circuit diagram showing an embodiment of a power supply circuit of current resonance type according to the present invention.

The power supply circuit of FIG. 1 is of current resonance type. It resonates a primary winding L61 of a switching transformer 64 and a current resonance capacitor C2I by turning on and off switching elements 61 and 62 and obtains high frequency output from a secondary winding L62 of the switching transformer 64 according to such resonance. For the above capacitor C2I, it uses a capacitor having the frequency characteristics that the capacity increases as the operation frequency of the switching elements 61 and 62 becomes lower. Except that the capacitor C2I has such characteristics, the present circuit has the same configuration as a conventional power supply circuit of current resonance type as shown in FIG. 5.

Described below is an embodiment of the present invention.

An output terminal of an alternating current (AC) power supply 51 or a commercial AC power, for example, is connected to an input terminal of a rectifier circuit 52, or a full-wave rectifier using a diode bridge, for example. The other output terminal of the AC power supply 51 is connected to the other input terminal of the rectifier circuit 52.

The output terminal on the negative polarity side of the rectifier circuit 52 is connected to the reference potential point.

The output terminal on the positive polarity side of the rectifier circuit 52 is connected to the reference potential point via a smoothing capacitor C51 and also connected to the reference potential point via switching elements 61 and 62 connected in series. For the switching elements 61 and 62, a MOSFET is used, for example.

The source of the switching element 61 is connected to the drain of the switching element 61 via the anode-cathode channel of a parasitic diode D61. The source of the switching element 62 is connected to the drain of the switching element 62 via the anode-cathode channel of a parasitic diode D22.

The switching elements 61 and 62 are alternately turned on and off by a drive circuit 63. The switching elements 61 and 62 and the diodes D61 and D62 constitute a switching means.

The connection point of the switching elements 61 and 62 is connected to the reference potential point via a voltage resonance capacitor C6V and at the same time connected to the reference potential point via the primary winding L61 of a switching transformer 64 and the current resonance capacitor C2I connected in series. Note here that the capacitor C2I has a larger capacity than the capacitor C6V. The above capacitor C2I is characterized by that its capacity increases as the operation frequency of the switching elements 61 and 62 declines. The secondary winding L62 of the switching transformer 64 is connected to an output terminal 65 via the anode-cathode channel of a diode D63 at an end and connected to the output terminal 65 via the anode-cathode channel of a diode D64 at the other end. The cathodes of the diodes D63 and D64 are connected to the reference potential point via a smoothing capacitor C65.

The cathodes of the diodes D63 and D64 are connected to an input terminal 661 of an error amplifier circuit 66 via a resistor R61 and also connected to an output terminal 662 of the error amplifier circuit 66 via a resistor R62 and the anode-cathode channel of a light emitting diode D60 in a photo coupler PC6. The error amplifier circuit 66 has a negative polarity terminal 663 connected to the reference potential point. The error amplifier circuit 66 amplifies the error between the voltage applied to the input terminal 661 via the resistor R61 and the target voltage and controls the current flowing through the light emitting diode D60 corresponding to such amplified voltage.

A control circuit 67 has a detection terminal 671 connected to the reference potential point via a resistor R63 and a phototransistor Tr60 in the photo coupler PC6 connected in series and has an output terminal 672 connected to the drive circuit 63. The light emitting diode D60 of the photo coupler PC6 emits light with the current corresponding to the error voltage. Upon receipt of such light by the phototransistor Tr60, the current corresponding to the received light amount flows from the detection terminal 671 of the control circuit 67 to the reference potential point via the resistor R63 and the collector-emitter channel of the phototransistor Tr60. The control circuit 67 prepares a control signal a1 at the output terminal 672 according to the current flowing from the detection terminal 671 to the resistor R63 and supplies such signal to the drive circuit 63. The drive circuit 63 supplies, corresponding to the control signal a1 from the control circuit 67, gate voltages VG11 and VG12 to turn on and off the switching elements 61 and 62 to the gates of the switching elements 61 and 62 respectively.

Thus, the resistors R61 and R62, the error amplifier circuit 66, the photo coupler PC6, the drive circuit 63 and the control circuit 67 control the operation frequency f of the switching elements 61 and 62 corresponding to change in the output voltage Eo on the secondary side of the switching transformer 64 and thereby keep the output voltage Eo constant.

In the above configuration, the rectifier circuit 52 and the smoothing capacitor C51 constitute a rectifier-smoother circuit which rectifies and smoothes the output voltage from the AC power supply 51 and outputs the smooth DC voltage Ei. The switching elements 61 and 62 on the charge side and on the discharge side are provided in series between the output terminal of the above rectifier-smoother circuit and the reference potential point. The drive circuit 63 is designed to turn on and off the switching elements 61 and 62 on the charge side and on the discharge side at different timings. The capacitor C2I provided in parallel with the switching element 62 on the discharge side is characterized by that its capacity increases as the operation frequency of the switching elements 61 and 62 lowers. The switching transformer 64 has its primary winding L61 inserted between the switching element 62 and the capacitor C2I so that high frequency output is generated at the secondary winding L62 corresponding to the resonance of the primary winding L61 and the capacitor C2I.

The operation of this power supply circuit according to the present invention will be described below.

The timing charts to show the operation of the current resonance power supply circuit of FIG. 1 are the same as those of FIGS. 6(a) to (e). The operation in a period (T10) of the power supply circuit as shown in FIG. 1 is the same as that illustrated in FIGS. 7(a) to (c) and FIGS. 8(a) to (c). Note that, however, the current IC6I of the capacitor C6I in FIG. 6(d) reads the current IC2 of the capacitor C2I and the capacitor C6I in FIGS. 7(a) to (c) and FIGS. 8(a) to (c) reads the capacitor C2I.

The operation waveform of a single period (T10) as shown in FIGS. 6(a) to (e) can be divided into six sections, which correspond to the times from t10 to t11, t11 to t12, t12 to t13, t13 to t14, t14 to t15 and t15 to t16.

In the time from timing t10 to timing t11, as shown in FIG. 7(a), the diode D61 is turned on and the current flows through the route from the capacitor C2I to the winding L61 and then to the diode D61.

In the time from timing t11 to timing t12, as shown in FIG. 7(b), the switching element 61 is turned on and the current flows through the route from the switching element 61 to the winding L61 and then to the capacitor C2I. Note that, however, the current flowing from the switching element 61 to the capacitor C6V during this time is omitted in the figure since it is of a small amount.

The time TD11 from timing t12 to timing t13 is a damper time and the switching elements and the diodes are turned off. As shown in FIG. 7(c), the current flows through the route from the capacitor C6V to the winding L61 and then to the capacitor C2I.

In the time from timing t13 to timing t14, as shown in FIG. 8(a), the diode D62 is turned on and the current flows through the route form the diode D62 to the winding L61 and then to the capacitor C2I.

In the time from timing t14 to timing t15, as shown in FIG. 8(b), the switching element 62 is turned on and the current flows through the route from the capacitor C2I to the winding L61 and then to the switching element 62.

The time TD12 from timing t15 to timing t16 is a damper time and the switching elements and the diodes are turned off. As shown in FIGS. 8(c), the current flows through the route from the capacitor C2I to the winding L61 and then to the capacitor C6V.

The capacitor C2I, which is an essential part of this embodiment according to the present invention, will be described below.

Figure 2:
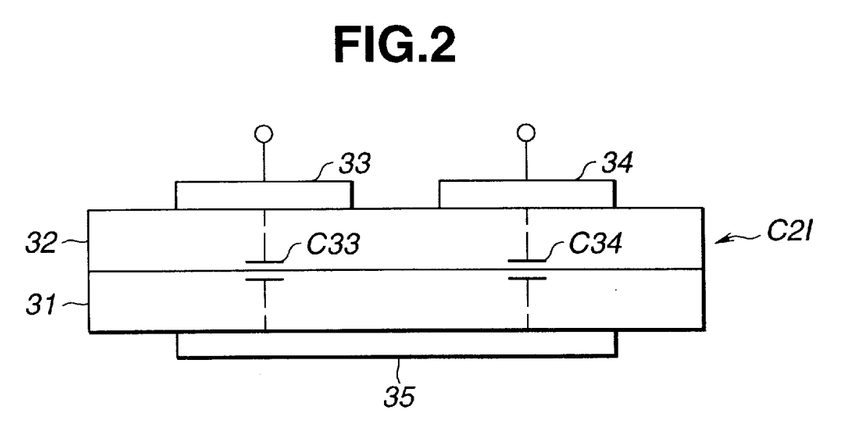
FIG. 2 is a cross sectional view showing an example of the current resonance capacitor as shown in FIG. 1.

FIG. 2 is a cross sectional view showing an example of a capacitor C2I as in FIG. 1.

In FIG. 2, the capacitor C2I comprises a base 31 made of a polyester film or a polypropylene film and a layer 32 made of a substance such as TiBa (Titanium-barium) having the negative frequency characteristics with respect to a dielectric constant. They are adhered with a binder and laminated and wound to form a capacitor. Formed on the side of the layer 32 opposite to the side facing to the base 31 is a pair of electrodes 33 and 34 made of aluminum paint. On the side of the base 31 opposite to the side facing to the layer 32, a conductor layer 35 made of aluminum paint is provided. With such structure, a capacity C33 is formed between the electrode 33 and the conductor layer 35 and a capacity C34 is formed between the electrode 34 and the conductor layer 35. Thus, a capacitor having the electrode 33 as a terminal and the electrode 34 as the other terminal is constituted.

Figure 3:
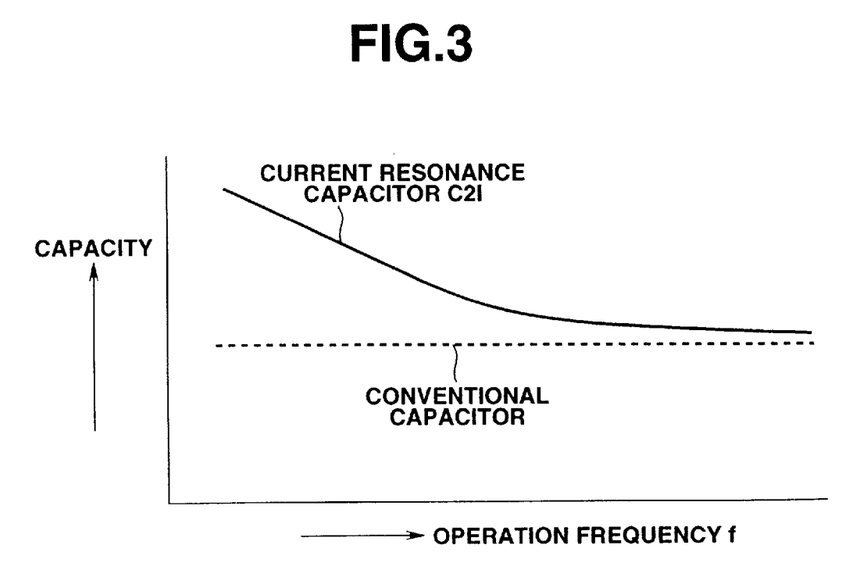
FIG. 3 is a graph showing the frequency characteristics for the capacity of the current resonance capacitor in FIG. 1.

FIG. 3 is a graph showing the frequency characteristics of the current resonance capacitor C2I as shown in FIG. 1. It shows the capacity on the vertical axis and the operation frequency f on the horizontal axis.

As understood from the figure, the conventional capacitor (C61 in FIG. 5) keeps a constant capacity without any change corresponding to the operation frequency f (as shown with broken line in the figure). In contrast, the capacitor C2I of the present invention has a larger capacity as the operation frequency f becomes lower in the range where the operation frequency f is below a certain frequency under the effect of the substance having negative frequency characteristics with respect to a dielectric constant. In other words, the capacity change of the capacitor C2I corresponding to the frequency has a negative characteristic (the characteristic to increase the capacity when the frequency becomes lower).

The effect caused by adoption of such a capacitor C2I is described below.

First, in the times T11 and T12 shown in FIG. 6(a), the voltage VL61 generated at the primary winding L61 of the switching transformer 64 can be, when considering the input voltage of the circuit to be Ei and the voltage generated at the capacitor C2I to be VC2I, expressed as follows:

$$\text{Time T11}: VL61 = Ei - VC2I = \frac{Ei}{2} - VC2I(t)\varepsilon^{j0} \quad (1)$$

$$= \frac{Ei}{2} + VC2I(t)\varepsilon^{j\pi}$$

$$\text{Time T12}: VL61 = -VC2I = -\frac{Ei}{2} - VC2I(t)\varepsilon^{j0} \quad (2)$$

$$= -\frac{Ei}{2} + VC2I(t)\varepsilon^{j\pi}$$

These formulae (1) and (2) show the voltage VL61 generated at the primary winding L61 of the switching transformer 64 in the applicable time. In the formulae (1) and (2), the first term represents the DC component and the second term represents the AC component (Resonance voltage). The second term represents that the AC component (Resonance voltage) has a level equivalent to that of the resonance voltage generated at the capacitor C2I but has a phase with a displacement for $\pi$ (radian). The DC component in formulae (1) and (2) is constant regardless of the operation frequency. However, the AC component (resonance voltage) has the frequency characteristics that it reaches the maximum level at the resonance frequency and becomes 0 when the frequency becomes infinite. Therefore, the maximum load can be supplied within the range free from out-of-resonance phenomenon when the operation frequency becomes equal to the resonance frequency. The power which can be supplied from the switching transformer 64 at the resonance frequency is determined below.

Suppose here that the resonance angular frequency is $\omega 0$, the resonance current is I, the voltage generated at the primary winding L61 of the switching transformer is VL61, the power which can be supplied from the switching transformer 64 at the resonance frequency is PL, the capacity of the capacitor C2I is C, and the inductance of the primary winding L61 is L. I and PL are determined follows. Note that the switching elements 61 and 62 are on duty for 1:1 ratio and that the DC voltage corresponding to a half of the input voltage Ei is stored in the capacitor C2I.

$$I = \sqrt{\frac{C}{L}} \cdot \frac{Ei}{2} \cdot \sin\omega 0\, t \quad (3)$$

$$VL61 = \frac{Ei}{2} + L\frac{dI}{dt} = \frac{Ei}{2} + \frac{Ei}{2} \cdot \cos\omega 0\, t \quad (4)$$

Since the phase angle between the resonance current and the resonance voltage at the resonance frequency is 0, the power PL generated at the primary winding L61 of the switching transformer 64 at the resonance frequency is as follows from the formulae (3) and (4):

$$PL = I \cdot VL61 \quad (5)$$

-continued $$= \sqrt{\frac{C}{L}} \cdot \left(\frac{Ei}{2}\right)^2 \cdot \sin\omega 0 \, t \, (1 + \cos\omega 0 \, t)$$

From this formula (5), as the capacity C of the capacitor C2I increases, the power PL which can be supplied from the switching transformer 64 at the resonance frequency increases in proportion to such capacity raised to the one-half power. In other words, as the operation frequency declines because of output voltage control when the AC voltage sharply declines or when the load rapidly increases, the capacity C of the capacitor C2I increases and the power PL to be supplied increases. This prevents out-of-resonance phenomena from occurring easily.

Figure 4:
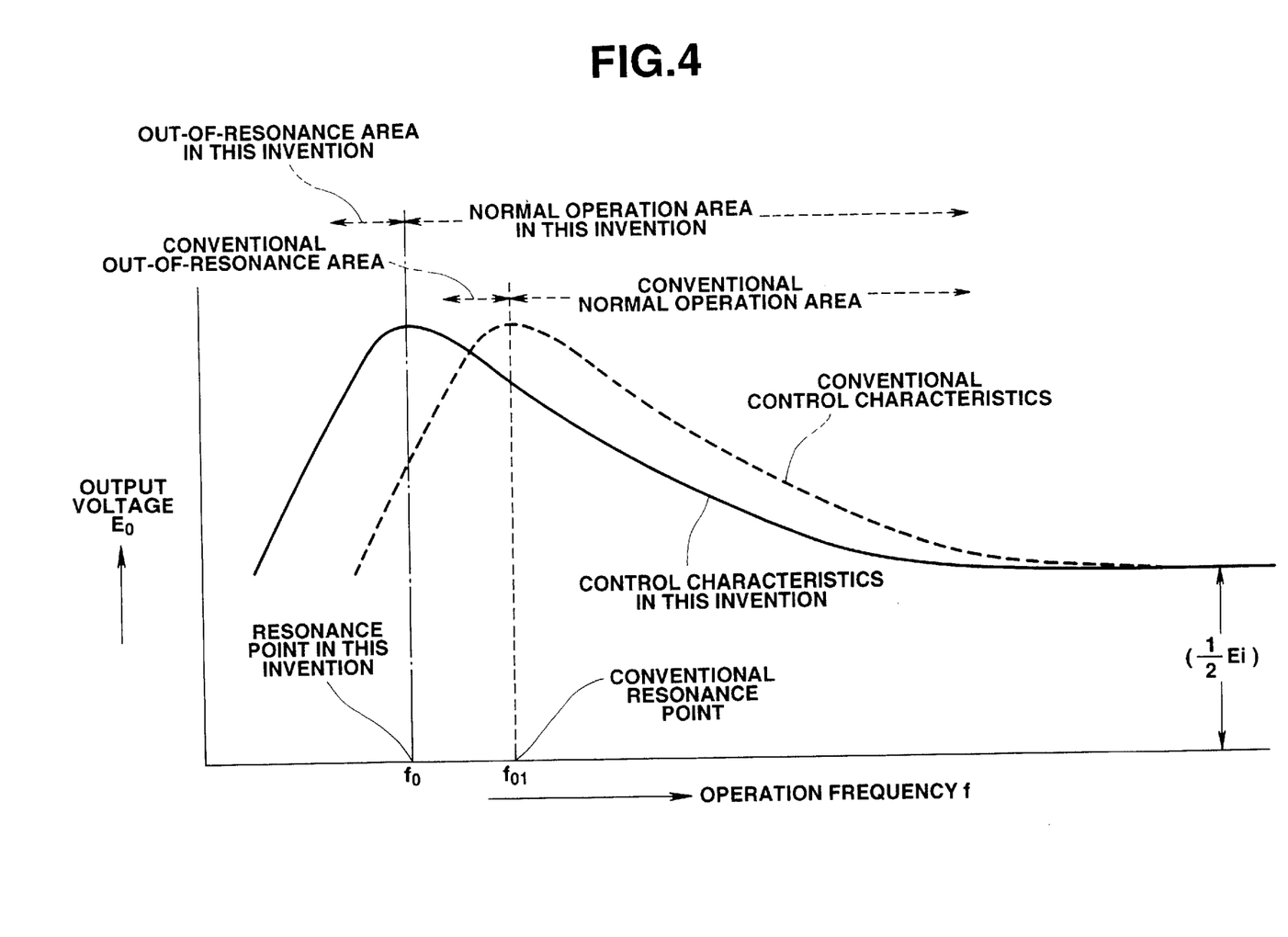
FIG. 4 is a graph illustrating the control characteristics of the output voltage caused by the change in the operation frequency of the power supply circuit in FIG. 1.

FIG. 4 is a graph showing the change characteristics of the output voltage corresponding to the change in the operation frequency f in the power supply circuit of current resonance type in FIG. 1. The output voltage Eo is indicated on the vertical axis and the operation frequency f is indicated on the horizontal axis.

In FIG. 4, when the output voltage Eo declines, the error amplifier circuit 66 detects the decline of the output voltage in the range of the normal operation area. In such case, the photo coupler PC6 and the control circuit 67 control the drive circuit 63 to change the on/off status of the switching elements 61 and 62 so that the operation frequency f is reduced and the output voltage Eo is increased. Thus, the output voltage is restored to the original level. When the operation frequency f becomes lower in the circuit of FIG. 1, the capacity C of the capacitor C2I increases and the resonance frequency $$f0 \, ( = 1 / 2\pi \sqrt{LC} \, )$$

declines. Since the resonance point f0 becomes lower than the resonance point f01 in the conventional example, the boundary between the normal operation area and the out-of-resonance area is shifted toward the lower frequency side. This means that the normal operation area is enlarged to the lower frequency side.

As described above, according to this embodiment of the present invention, the capacitor C2I has a larger capacity and a lower resonance frequency under the effect of the substance having the negative frequency characteristics with respect to a dielectric constant when a operation frequency f lowers. Even when the operation frequency of the switching elements on the charge side and the discharge side becomes lower than the resonance frequency, the out-of-resonance phenomenon hardly occurs. This prevents the current flowing through the switching elements and the parasitic diodes, and thereby protects the switching elements from being destroyed.

In the embodiment of the present invention as shown in FIG. 1, a field effect transistor such as a MOSFET is used as the switching element and the parasitic diode incorporated in the structure of the field effect transistor is utilized for reverse current flowing. However, the switching element may comprise a bipolar type transistor such as an NPN transistor. A bipolar type transistor does not incorporate a parasitic diode between the collector and emitter, but the operation similar to that made by the circuit of FIG. 1 can be realized by connecting a diode having a reverse conductivity to that of the transistor between the collector and the emitter in parallel.

Note that the present invention is not limited to the embodiment as described above. It can be variously modified and implemented within the scope and spirit of the present invention.

What is claimed is:

1. A resonance power supply circuit of variable capacity type, comprising:

switching means adapted for connection to a DC voltage source and a reference potential and including a first and a second switching element which are turned on and off alternately;

a transformer having a primary winding to which a switching output obtained at a connection point of said first and second switching element is supplied and a secondary winding generating an output voltage in response thereto; and a resonance capacitor connected to said primary winding to form a resonance circuit together with said primary winding, wherein said resonance capacitor has frequency response characteristics in which capacity of said resonance capacitor increases as the operation frequency of said switching means declines.

2. A resonance power supply circuit according to claim 1, wherein said switching means is connected in series between said DC voltage source and the reference potential point and includes first and second switching elements which are alternately turned on and off and the connection point of said first and second switching elements is connected to the primary winding of said transformer.

3. A resonance power supply circuit according to claim 2, wherein said switching elements are MOSFETs.

4. A resonance power supply circuit of variable capacity type according to claim 1, wherein said resonance capacitor includes a first layer member made of polyester or polypropylene film and a second layer member, made of titanium-barium (TiBa), having negative frequency characteristics with respect to a dielectric constant and which utilizes the capacity generated between said first and second layer members.

5. A resonance power supply circuit according to claim 4, wherein said second layer member is made of titanium-barium (TiBa).

6. A resonance power supply circuit of variable capacity type, comprising:

switching means having a first and second switching transistors connected in series between the DC voltage source and the reference potential point;

a transformer having a primary winding connected to the connection point of said first and second switching transistors and a secondary winding electromagnetically connected to the primary winding;

a resonance capacitor connected in series with said primary winding to form a series resonance circuit;

output voltage generation means connected to the secondary winding of said transformer; and control means to control an on/off status of said switching transistors corresponding to a change in the output voltage from said output voltage generation means, wherein capacity of said resonance capacitor increases as the operation frequency of said switching means declines in the range where the operation frequency of said switching means is below a certain frequency.

7. A power supply circuit according to claim 6, wherein said resonance capacitor comprises a first layer member made of polyester or polypropylene film and a second layer member made of titanium-barium (TiBa) adhered together, and said two adhered members being wound in multiple to form a capacitor.

* * * * *